(12) United States Patent
Dornier et al.

(10) Patent No.: US 10,273,881 B2
(45) Date of Patent: Apr. 30, 2019

(54) FOREIGN OBJECT DAMAGE SCREEN FOR GAS TURBINE SYSTEM

(71) Applicant: General Electric Company, Schenectady, NY (US)

(72) Inventors: Richard Garland Dornier, Houston, TX (US); Jason Alan Nassar, League City, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 346 days.

(21) Appl. No.: 15/092,197

(22) Filed: Apr. 6, 2016

(65) Prior Publication Data

US 2017/0292448 A1    Oct. 12, 2017

(51) Int. Cl.
*F02C 7/055*    (2006.01)
*B64D 33/02*    (2006.01)

(52) U.S. Cl.
CPC .............. *F02C 7/055* (2013.01); *B64D 33/02* (2013.01); *B64D 2033/022* (2013.01); *F05D 2220/32* (2013.01); *F05D 2300/43* (2013.01); *F05D 2300/431* (2013.01); *F05D 2300/433* (2013.01); *F05D 2300/501* (2013.01); *F05D 2300/6012* (2013.01); *F05D 2300/614* (2013.01); *Y02T 50/672* (2013.01)

(58) Field of Classification Search
CPC ..... B64D 33/02; B64B 2033/022; F02C 7/05; F02C 7/047; F02C 7/055; Y02T 50/672
USPC ............................ 55/306; 60/39.092, 39.093
See application file for complete search history.

(56) References Cited

U.S. PATENT DOCUMENTS

| | | | |
|---|---|---|---|
| 3,646,980 | A | 3/1972 | Peterson |
| 3,871,844 | A | 3/1975 | Calvin, Sr. |
| 5,141,046 | A | 8/1992 | Duncan |
| 6,588,705 | B1 | 7/2003 | Frank |
| 7,803,204 | B1 | 9/2010 | Mladinich |
| 8,763,382 | B2 | 7/2014 | Champoux et al. |
| 2011/0016845 | A1 | 1/2011 | Silva et al. |
| 2011/0146294 | A1 | 6/2011 | Townsend |
| 2014/0017068 | A1 | 1/2014 | Herrera |
| 2014/0123674 | A1* | 5/2014 | Hao ........................ F01D 25/08 60/782 |

(Continued)

FOREIGN PATENT DOCUMENTS

EP    1 674 694 A2    6/2006

OTHER PUBLICATIONS

"Dyneema Fasern," swiss-composite, Retrieved from the Internet URL: https://www.swiss-composite.ch/pdf/t-dyneema.pdf, on Dec. 7, 2017, pp. 1-4.

(Continued)

*Primary Examiner* — Duane Smith
*Assistant Examiner* — Minh Chau T Pham
(74) *Attorney, Agent, or Firm* — Fletcher Yoder, P.C.

(57) ABSTRACT

A system includes a foreign object damage (FOD) screen configured to be disposed upstream of an air intake of a gas turbine engine and to keep debris from entering the air intake. The FOD screen is configured to extend across a fluid flow path extending through the air intake into the gas turbine engine. The FOD screen includes a flexible, woven fabric made of a non-metal material and configured to absorb and dissipate energy from the debris, and the flexible, woven fabric includes a tensile strength ranging between 2700 megapascals (mPa) and 3700 mPa.

18 Claims, 7 Drawing Sheets

(56) References Cited

U.S. PATENT DOCUMENTS

2014/0352795 A1    12/2014  Kline
2015/0345391 A1*   12/2015  Snyder ................... F02C 7/055
                                                   60/39.092
2016/0159488 A1*    6/2016  Roach .................... B29D 22/00
                                                   416/245 R

OTHER PUBLICATIONS

Extended European Search Report and Opinion issued in connection with corresponding EP Application No. 17164752.2 dated Aug. 22, 2017.

* cited by examiner

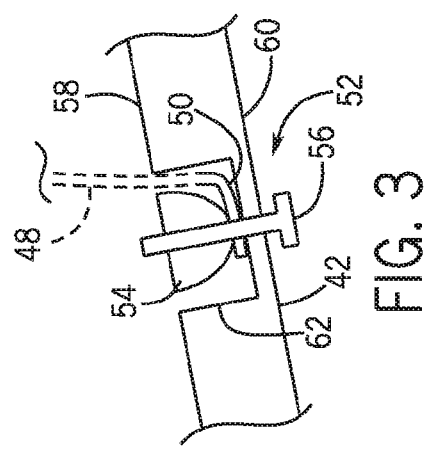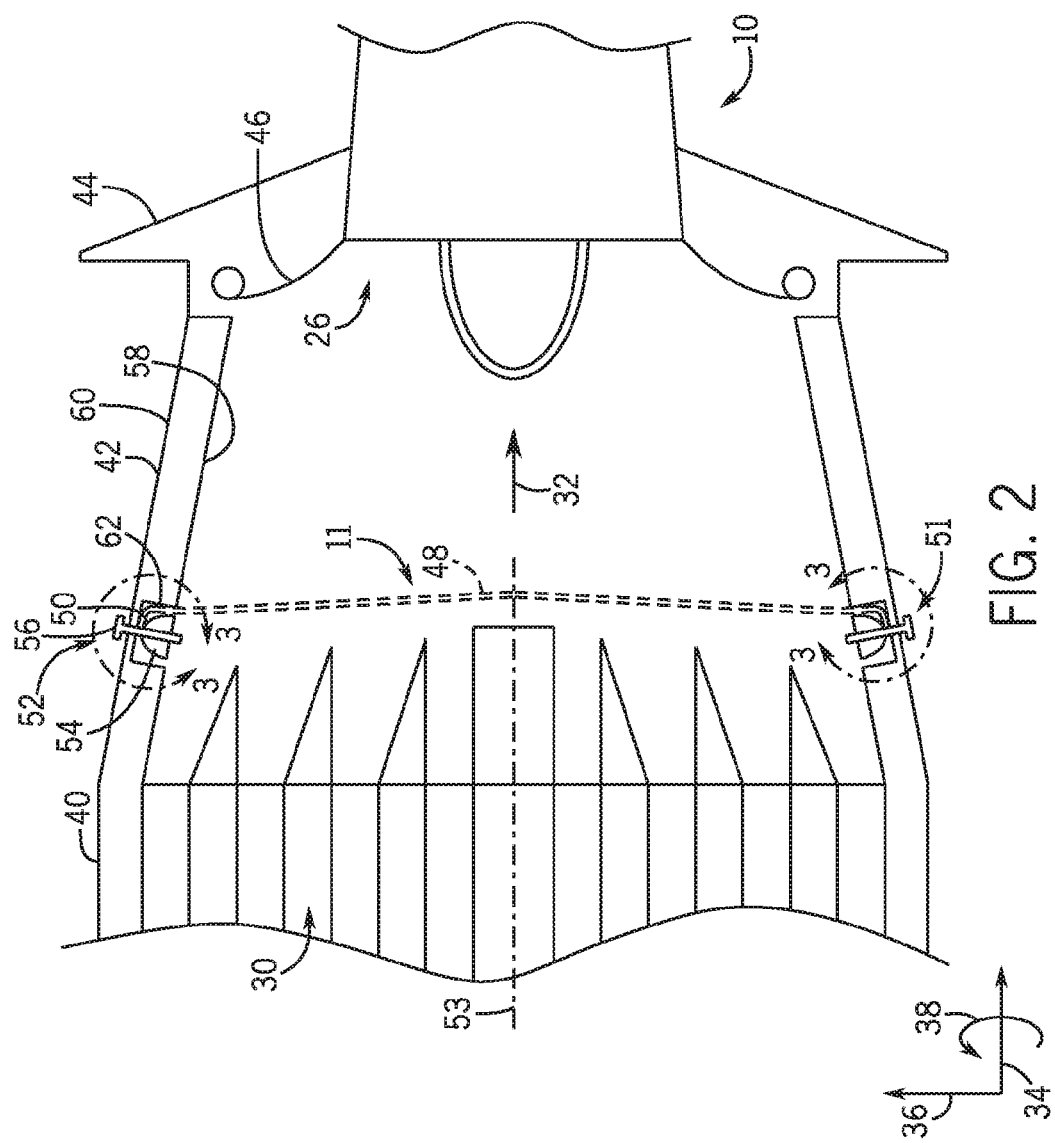

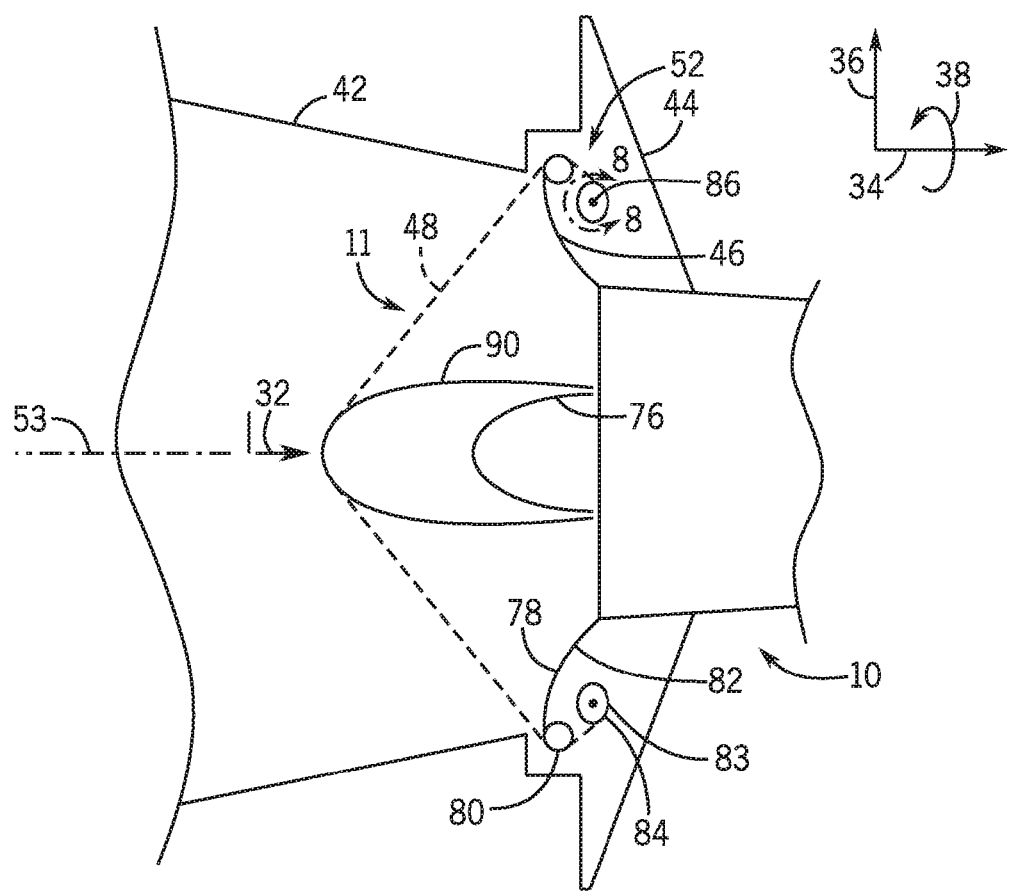
FIG. 7
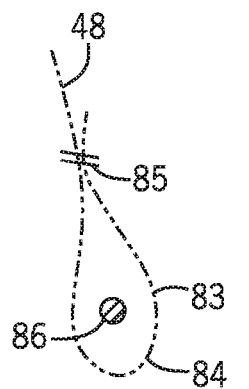   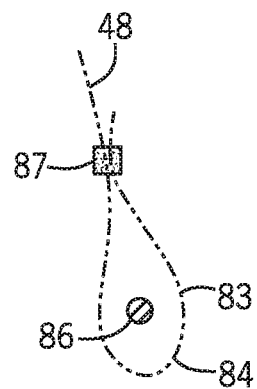   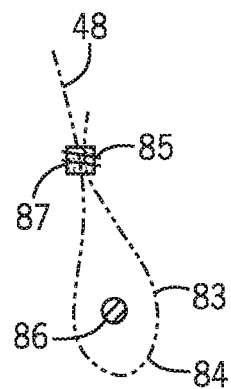
FIG. 8          FIG. 9          FIG. 10

FOREIGN OBJECT DAMAGE SCREEN FOR GAS TURBINE SYSTEM

BACKGROUND

The subject matter disclosed herein relates to foreign object damage (FOD) screen and, more specifically, a FOD screen for a gas turbine system.

A gas turbine engine may include a compressor, a combustor, and a turbine. Gases are compressed in the compressor, combined with fuel, and then fed into to the combustor, where the gas/fuel mixture is combusted. The high temperature and high energy exhaust fluids are then fed to the turbine, where the energy of the fluids is converted to mechanical energy. Typically, a gas turbine engine utilizes a FOD screen to block debris from entering the gas turbine engine. These FOD screens are made of a rigid material that is relied on for withstanding impact with the FOD screen. However, due to the inflexible nature of the FOD screen the area of deployment is limited. In addition, these FOD screens are difficult to install and remove. Further, the inflexible nature of the FOD screen subjects it to denting or breakage.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a system includes a foreign object damage (FOD) screen configured to be disposed upstream of an air intake of a gas turbine engine and to keep debris from entering the air intake. The FOD screen is configured to extend across a fluid flow path extending through the air intake into the gas turbine engine. The FOD screen includes a flexible, woven fabric made of a non-metal material that is configured to absorb and dissipate energy from the debris, and the flexible, woven fabric includes a tensile strength ranging between 2700 megapascals (mPa) and 3700 mPa.

In accordance with a second embodiment, a system includes a foreign object damage (FOD) screen configured to be disposed upstream of an air intake of a gas turbine engine and to keep debris from entering the air intake. The FOD screen is configured to extend across a fluid flow path extending through the air intake into the gas turbine engine. The FOD screen includes an open mesh of para-aramid synthetic fibers.

In accordance with a third embodiment, a foreign object damage (FOD) screen configured to keep debris from entering an air intake of a gas turbine engine is provided. The FOD screen includes an open mesh of para-aramid synthetic fibers and a rubberized edge disposed along an entire perimeter of the open mesh of para-aramid synthetic fibers. The FOD screen is configured to be disposed upstream of the air intake of the gas turbine engine. The open mesh of para-aramid synthetic fibers is configured to extend across a fluid flow path that extends through the air intake into the gas turbine engine, and the rubberized edge is configured to enable coupling of the FOD screen upstream of the air intake.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 2 is a cross-sectional side view of an embodiment of an inlet silencer and the air intake of FIG. 1 coupled to each other and having the FOD screen disposed between them (e.g., having an outer edge of the FOD screen disposed within a recess);

FIG. 3 is a cross-sectional side view of an embodiment of an attachment mechanism coupling the FOD screen to a housing wall, taken with line 3-3 of FIG. 2;

FIG. 7 is a cross-sectional side view of an embodiment of the FOD screen of FIG. 1 secured over and coupled to an engine bell mouth and having an elongated extension coupled to a nose cone;

FIG. 8 is a cross-sectional side view of an embodiment of a loop at the edge of the FOD screen (e.g., joined by stitching), taken within line 8-8 of FIGS. 6 and 7;

FIG. 9 is a cross-sectional side view of an embodiment of a loop at the edge of the FOD screen (e.g., joined by fusion), taken within line 8-8 of FIGS. 6 and 7;

FIG. 10 is a cross-sectional side view of an embodiment of a loop at the edge of the FOD screen (e.g., joined by stitching and fusion), taken within line 8-8 of FIGS. 6 and 7.

DETAILED DESCRIPTION

Figure 1:
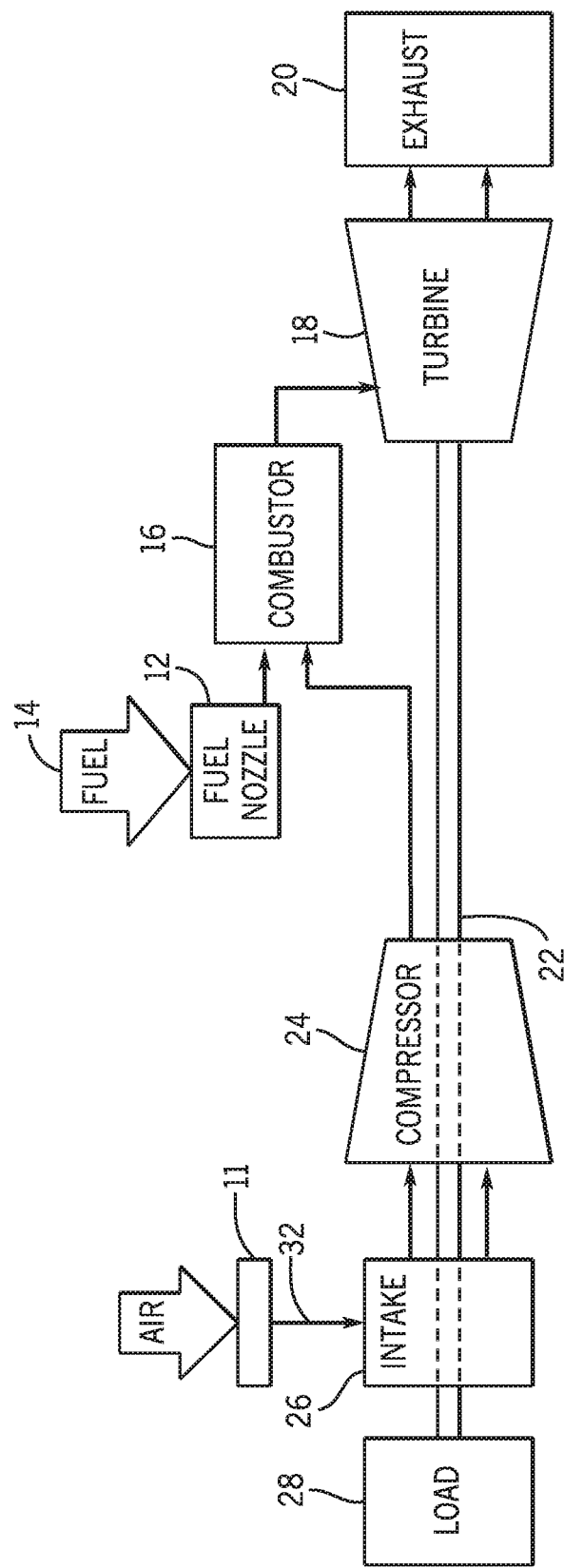
FIG. 1 is a block diagram of an embodiment of a turbine system having a flexible, non-metal foreign object damage (FOD) screen upstream of an air intake.

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward a FOD screen made of a flexible, non-metal material that is configured to block debris from entering a gas turbine engine (e.g., via an air intake). The flexible nature of the material of the FOD screen is configured to absorb and dissipate energy from the debris by providing a larger surface area to interface with the debris as the material moves upon impact. In particular, the flexible, non-material may be a woven mesh made of a material having a high tensile strength (e.g., between approximately 2700 megapascals (mPa) and 3700 mPa) and a high modulus of elasticity (e.g., between approximately 130 and 180 gigapascals (gPa)). In addition, the material is chemically inert. In certain embodiments, the material may be made of para-aramid synthetic fibers (e.g., Kevlar®, Twaron®, etc.). In certain embodiments, the FOD screen is disposed upstream of an air intake for a gas turbine engine. For example, the FOD screen may be coupled to one or more walls upstream of the air intake. In particular, the FOD screen may be coupled to a wall of a housing that houses the inlet silencer with the FOD screen located between the inlet silencer and the air intake. In other embodiments, the FOD screen may be disposed over and/or coupled to a bell mouth of the gas turbine engine upstream of the air intake. The flexible, non-metal material of the FOD screen is configured to move axially relative to an axial location of coupling of the FOD screen (e.g., to one or more walls). The disclosed embodiments of the FOD screen avoid the vibration wear and corrosion experienced by typical FOD screens (e.g., made of metal). In addition, the disclosed embodiments simplify the installation and removal of the FOD screen. Further, the flexible nature of the material of the disclosed FOD screen enables the FOD screen to be installed in areas typically considered impractical or difficult for installation.

FIG. 1 is a block diagram of an embodiment of a turbine system 10 (e.g., gas turbine engine such as an aircraft engine utilized either in aircraft or industrial power plant) having a FOD screen 11. As described in detail below, the disclosed FOD screen 11 includes a woven mesh of a flexible, non-metal material. The flexible nature of the mesh of the FOD screen 11 blocks debris or foreign objects from entering an air intake 26 of the turbine system 10 while absorbing and dissipating energy. In particular, as the woven mesh moves axially (e.g., relative to a point of attachment of the FOD screen 11) more surface area of the mesh interfaces with or contacts the debris to dissipate energy. The material forming the mesh has a high tensile strength ranging between approximately 2700 and 3700 mPa. Specifically, the tensile strength may range between approximately 2700 to 3000 mPa, 3000 to 3400 mPa, or 3400 to 3700 mPa, and all subranges therebetween. For example, the tensile strength may be approximately 2700, 2800, 2900, 3000, 3100, 3200, 3300, 3400, 3500, 3600, or 3700 mPa. Also, the material forming the mesh has a high modulus of elasticity ranging between approximately 130 and 180 gPa). Specifically, the modulus of elasticity may range between approximately 130 to 155 gPa, 155 to 180 gPa, 130 to 145 gPa, or 145 to 160 gPa, or 160 to 180 gPa, and all subranges therebetween. For example, the modulus of elasticity may be approximately 130, 140, 150, 160, 170, or 180 gPa. Further, the material forming the mesh has a density ranging between approximately 1.40 and 1.45 grams per cubic centimeter ($g/cm^3$). For example, the density may approximately 1.40, 1.41, 1.42, 1.43, 1.44, or 1.45 $g/cm^3$. Thus, the FOD screen 11 is lighter than typical FOD screens without sacrificing the ability to block foreign objects or debris. The material forming the mesh is also chemically inert. In certain embodiments, the flexible, non-metal material of the FOD screen 11 may be made of para-aramid synthetic fibers (e.g., Kevlar®, Twaron®, etc.). The flexible nature of the FOD screen 11 minimizes denting or breakage to the screen as well as wear damage from vibration. Thus, the FOD screen 11 includes a greater product life than typical FOD screens 11.

The turbine system 10 may use liquid or gas fuel, such as natural gas and/or a hydrogen rich synthetic gas, to drive the turbine system 10. As depicted, the fuel nozzles 12 intake a fuel supply 14, mix the fuel with air, and distribute the fuel-air mixture into a combustor 16 in a suitable ratio for optimal combustion, emissions, fuel consumption, and power output. The turbine system 10 may include fuel nozzles 12 located inside one or more combustors 16. The fuel-air mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. In certain embodiments, the shaft 22 may also be connected to a load 28 (e.g., coupled to either side of the turbine system 10), which may be a vehicle or a stationary load, such as an electrical generator in a power plant or a propeller on an aircraft, for example. The load 28 may include any suitable device capable of being powered by the rotational output of the turbine system 10. In certain embodiments, the turbine system 10 may not be coupled to a load 28.

In certain embodiments, the air provided to air intake 26 may pass through an inlet silencer 30 prior to entering the air intake 26. The inlet silencer 30 reduces air borne noise emanating adjacent the air intake 26. The FOD screen 11 is disposed upstream of the air intake 26 (in certain embodiments, between an inlet silencer and the air intake 26) and extends across a fluid flow path 32 (e.g., air flow path) extending through the air intake 26 (and, in certain embodiments, an inlet silencer) into the turbine system 10 (e.g., gas turbine engine). In certain embodiments, the FOD screen 11 is coupled to one or more walls located upstream of the air intake 26. For example, the FOD screen 11 may be coupled to a wall (e.g., annular wall) of a housing having an inlet silencer. In certain embodiments, the FOD screen 11 is coupled to one or more walls (not part of a housing of an inlet silencer) upstream of the air intake 26. In other embodiments, the FOD screen 11 is coupled to and extends across an upstream end of an engine bell mouth defining the air intake 26. The disclosed embodiments of the FOD screen 11 avoid the vibration wear and corrosion experienced by typical FOD screens (e.g., made of metal). In addition, the disclosed embodiments simplify the installation and removal of the FOD screen 11. Further, the flexible nature of the material of the disclosed FOD screen 11 enables the FOD screen 11 to be installed in areas typically considered impractical or difficult for installation. It should be noted in certain embodiments, a temporary screen having a finer mesh (than the FOD screen 11) may be disposed upstream of the FOD screen 11.

FIG. 2 is a cross-sectional side view of an embodiment of the inlet silencer 30 and the air intake 26 of FIG. 1 coupled to each other and having the FOD screen 11 disposed between inlet silencer 30 and the air intake 26. As indicated by the legend, arrow 34 indicates an axial axis or direction, arrow 36 indicates a radial axis or direction, and arrow 38 indicates a circumferential axis or direction. As depicted, the inlet silencer 30 is disposed within a housing 40 coupled to the air intake 26 of the gas turbine engine 10. A wall 42 (e.g., annular wall) of the housing 40 extends to and couples to a wall 44 extending (e.g., radially 36) from gas turbine engine 10. The wall 44 is disposed adjacent to a bell mouth 46 that defines the air intake 26. In certain embodiments, the gas turbine engine 10 may not be coupled to the inlet silencer 30. Instead, one or more walls 42 (not associated with or part of the housing 40 of the inlet silencer 30) may extend from the wall 44 for coupling with the FOD screen 11. As depicted, the FOD screen 11 is coupled to the wall 42 of the housing 40. The FOD screen 11 is disposed downstream of the inlet silencer 30 and upstream of the air intake 26. The FOD screen 11 blocks foreign objects or debris from entering the gas turbine engine 10 via the air intake 26. The FOD screen 11 includes a woven mesh 48 made of the flexible, non-metal material as described above (e.g., para-aramid synthetic fibers). The woven mesh 48 extends (e.g., radially 36) across the fluid flow path 32 extending through both the inlet silencer 30 and the air intake 26 into the gas turbine engine 10. In certain embodiments, the woven mesh 48 has an elliptical shape (e.g., circular shape). In other embodiments, the woven mesh 48 may have a non-elliptical shape. In certain embodiments, the FOD screen 11 includes a rubberized edge 50 (e.g., annular rubberized edge) disposed about an entire perimeter of the woven mesh 48. The rubberized edge 50 may be made of a synthetic rubber, fluropolymer elastomer, polychloropene, or a combination thereof, or similar material.

As depicted in FIGS. 2 and 3, the FOD screen 11 is coupled to the wall 42 of the housing 40 at an axial location 51 (e.g., relative to a longitudinal axis 53 of the housing 40 and/or the gas turbine engine 10) via an attachment mechanism 52. The woven mesh or fabric 48, due to its flexible nature, is configured to move axially 34 relative both to the axial location 51 of the coupling of the FOD screen 11 to the wall 42 and the longitudinal axis 53. This enables the woven mesh or fabric 48 to absorb and dissipate energy from the debris or foreign objects (while blocking the debris from entering the air intake 26) by providing a larger surface area to interface with the debris as the woven mesh 48 moves axially 34 upon impact.

Figure 4:
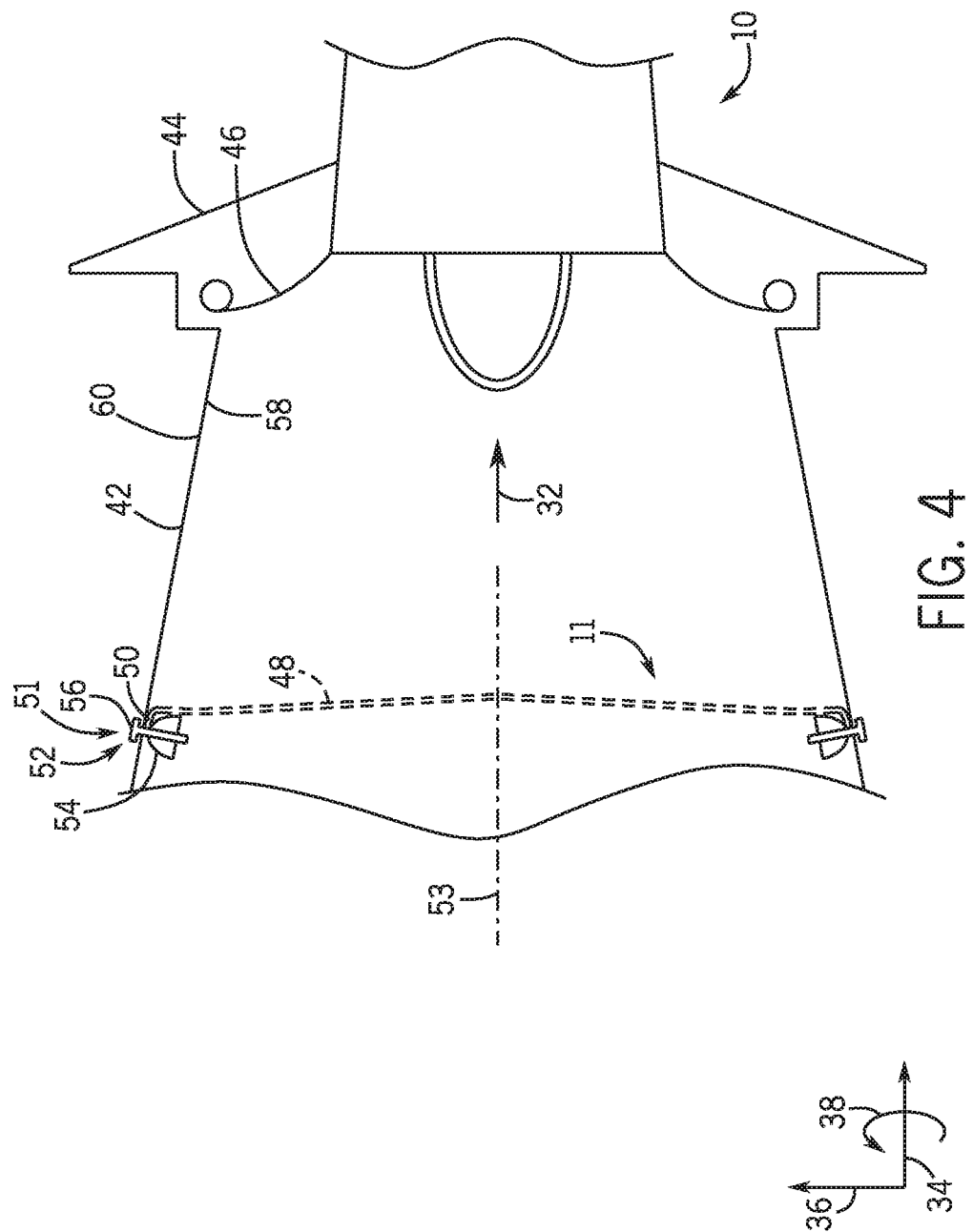
FIG. 4 is a cross-sectional side view of an embodiment of the FOD screen disposed upstream of the air intake of FIG. 1.

The attachment mechanism 52 includes an annular retaining ring (e.g., compression ring) 54 and a plurality of fasteners 56 (e.g., bolts, screws, etc.). As depicted in FIGS. 2 and 3, the rubberized edge 50 is partially disposed about the annular retaining ring 54 along an entirety of a circumference of the ring 54 in the circumferential direction 38. The rubberized edge 50 is disposed between the annular retaining ring 54 and an inner surface 58 of the wall 42. Each fastener 56 of the plurality of fasteners 56 is coupled to the FOD screen 11 and the ring 54 at multiple circumferential locations at the axial location 51. Each fastener 56 of the plurality of fasteners 56 is disposed through the wall 42 (e.g., thru an outer surface 60 and the inner surface 58), the rubberized edge 50, and the ring 54 to couple the FOD screen 11 to the wall 42. As depicted, in FIGS. 2 and 3, the rubberized edge 50 and the ring 50 are disposed in a recess 62 of the wall 42. The recess 62 extends 360 degrees along the wall 42 at the axial location 51. In addition, the attachment mechanism 52 and the recess 62 block axial 34 movement of the outer edge (e.g., rubberized edge 50) of the FOD screen 11 relative to the axial location 51. In certain embodiments, as depicted in FIG. 4, the wall 42 does not include the recess 62. As depicted in FIG. 4, the wall 42 is not associated with the housing 40 of air inlet 30. In certain embodiments, the wall 42 in FIG. 4 may be part of the housing 40 as shown in FIG. 3.

Figure 5:
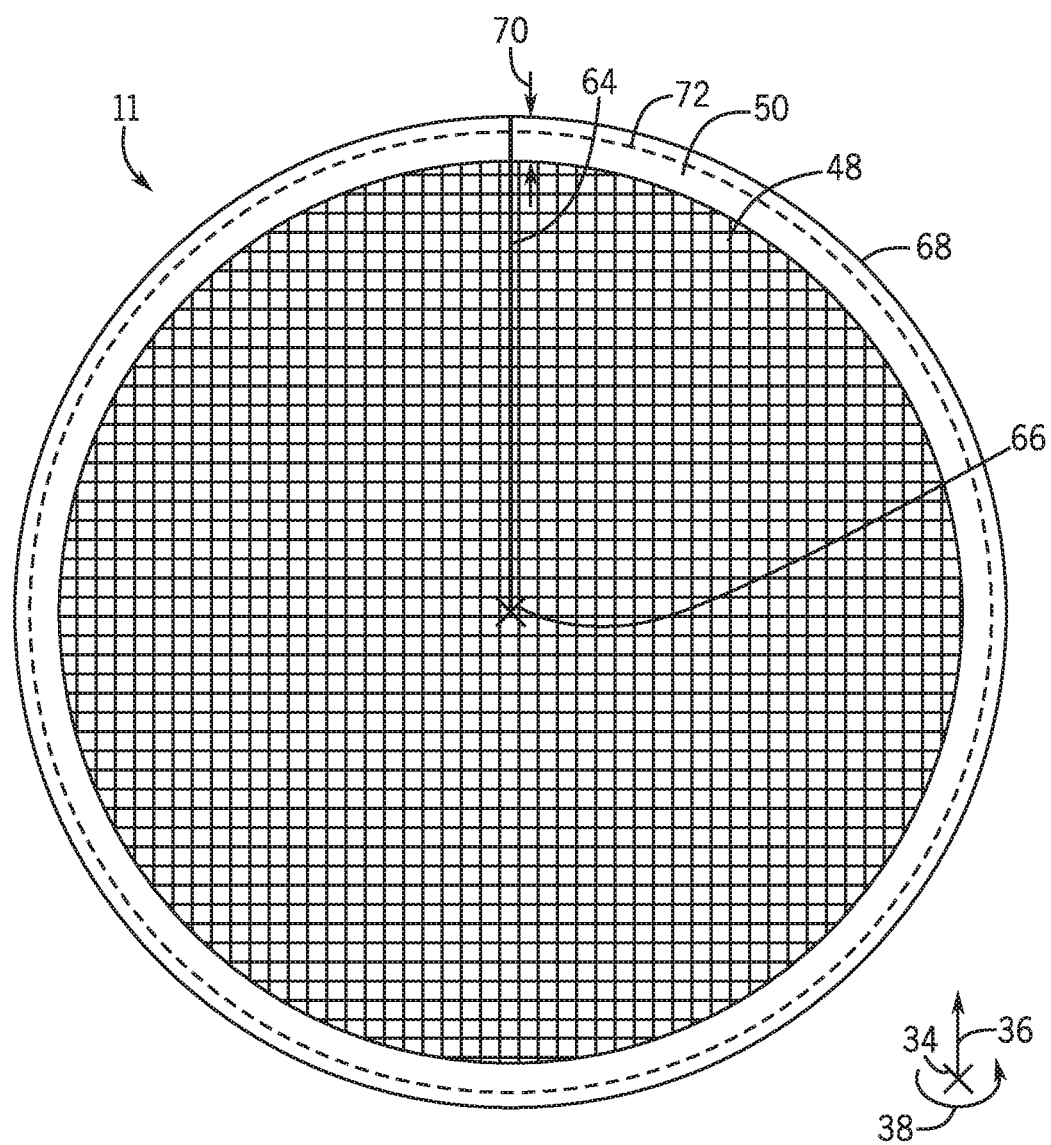
FIG. 5 is a front view of an embodiment of the FOD screen of FIG. 1.

FIG. 5 is a front view of an embodiment of the FOD screen 11 of FIG. 1. The FOD screen 11 includes the woven mesh 48 and the rubberized edge 50 as described above. As depicted, the FOD screen 11 includes an elliptical (e.g., circular) shape. In other embodiments, the FOD screen 11 may include a different shape (e.g., square, octagon, triangle, or any other shape). The FOD screen 11 includes a radius 64 (e.g., from a central point 66) and an outer circumference 68. The rubberized edge 50 is annular and has a distance 70 (e.g., radial length). Besides being disposed about an outer edge 72 (indicated by a dashed line) of the woven mesh 48, the rubberized edge 50 may extend radially 36 on each side of the woven mesh 48 from the outer edge 72 along the outer periphery 74 of the woven mesh 48. Thus, a portion of the woven mesh 48 along the outer periphery 74 is disposed within the rubberized edge 50. The distance 70 of the rubberized edge 50 relative the radius 64 may range between approximately 2 and 13 percent, 2 and 7 percent, or 7 and 13 percent, and all subranges there between.

Figure 6:
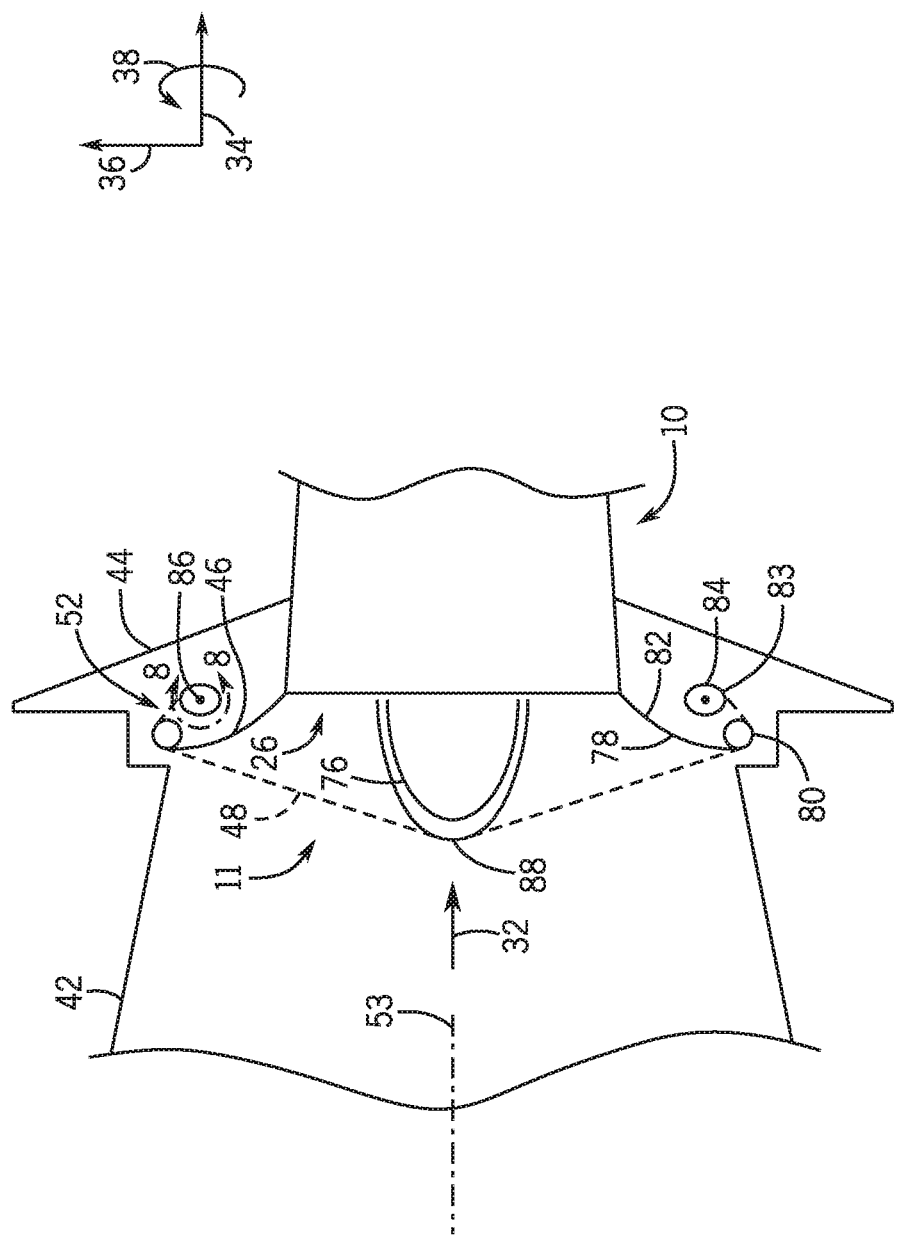
FIG. 6 is a cross-sectional side view of an embodiment of the FOD screen of FIG. 1 secured over and coupled to an engine bell mouth.

FIG. 6 is a cross-sectional side view of an embodiment of the FOD screen 11 secured over and coupled to the engine bell mouth 46. As depicted in FIG. 6, the FOD screen 11 is disposed over (e.g., fastened about) the engine bell mouth 46. In particular, the woven mesh 48 (made of the materials described above) extends over a nose cone 76 (and puck 88) of the gas turbine engine 10, over an upstream surface 78 (e.g., facing the inlet silencer 30) of the engine bell mouth 46, around an outer edge 80 of the engine bell mouth 46, and behind a downstream surface 82 (e.g., facing away from the inlet silencer 30) of the engine bell mouth 46. The FOD screen 11 includes an edge 83 folded over to form a ring or loop 84 disposed about an entire (or nearly entire) perimeter of the woven mesh 48 and extending the circumferential direction 38. A heavy duty cable or string 86 runs through the ring or loop 84 that is configured to tighten or secure the FOD screen 11 to the engine bell mouth 46. As depicted in FIG. 6, a puck or hardened plastic extension 88 is disposed on an end of the nose cone 76. The puck 88 reduces wear on the woven mesh 48 of the FOD screen 11. Similarly, as depicted in FIG. 7, an elongated puck or hardened plastic extension 90 may be disposed on the end of the nose cone 76 to increase the surface area of the woven mesh 48 to minimize pressure losses due to the presence of the FOD screen 11. In certain embodiments, instead of the puck 90, the gas turbine engine 10 may include a longer nose cone 76.

The folded over edge 83 in FIGS. 6 and 7 may be coupled to form the ring or loop 84 in a variety of ways. In certain embodiments, as shown in FIG. 8, the folded over edge 83 is joined via stitching 85 (e.g., via multipass sewing) to form the ring or loop 84. In other embodiments, as shown in FIG. 9, the folded over edge 83 is joined via a fusing material 87 (e.g., rubber or an adhesive such as glue). In other embodiments, as shown in FIG. 10, the folded over edge 83 is joined via a combination of stitching and fusing material 87.

Figure 11:
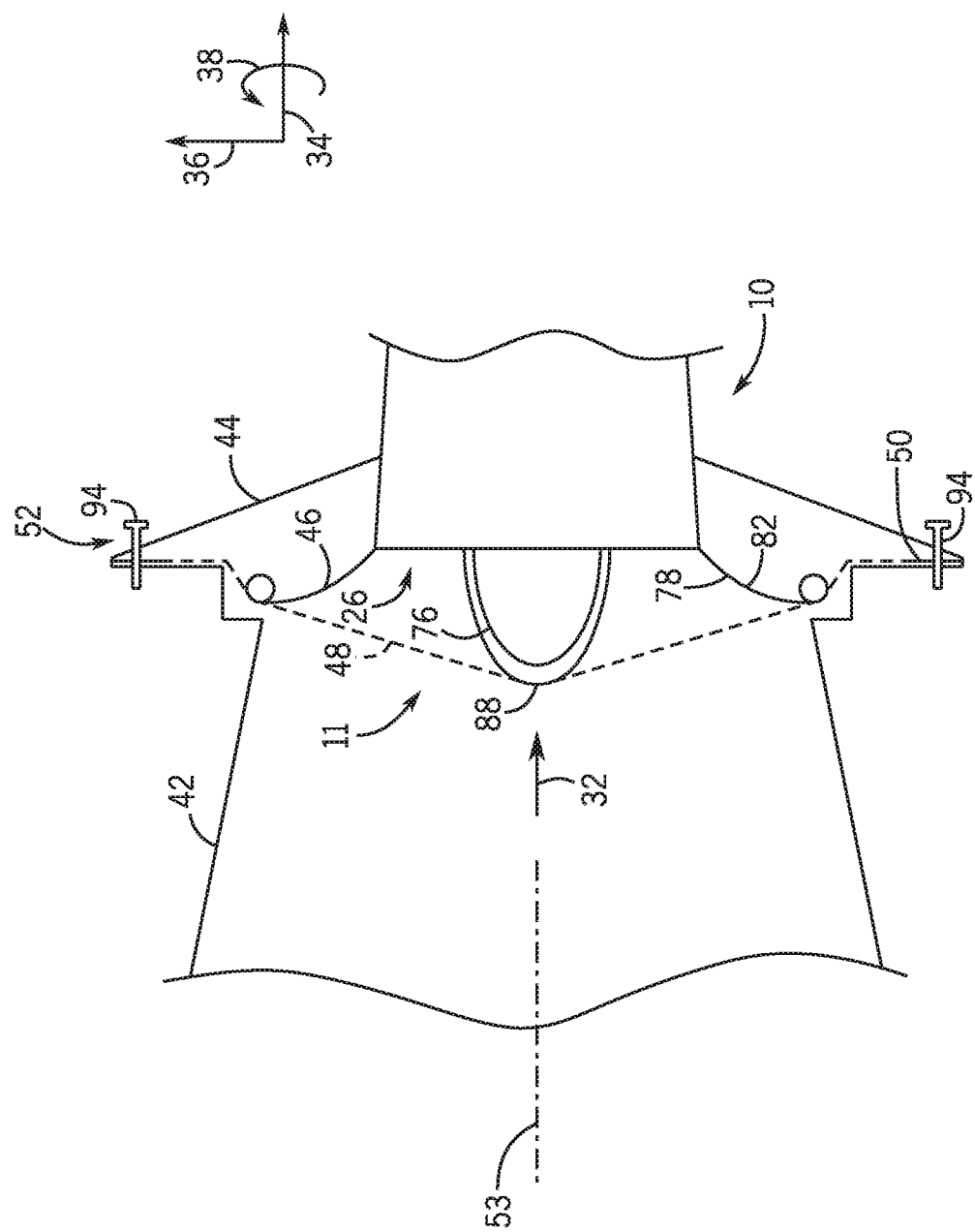
FIG. 11 is a cross-sectional side view of an embodiment of the FOD screen of FIG. 1 secured over engine bell mouth.

FIG. 11 is a cross-sectional side view of an embodiment of the FOD screen 11 secured over the engine bell mouth 46. The FOD screen 11 is disposed over the engine bell mouth 46 as described in FIG. 6. However, as depicted in FIG. 11, the FOD screen 11 (instead of wrapping behind the downstream surface 82 of the engine bell mouth 46) has the woven screen 48 extend radially 36 toward a seal 92 (e.g., bell mouth seal) between the walls 42, 44. The rubberized edge 50 is disposed between the walls 42, 44 at the seal 92 and a plurality of fasteners 94 (e.g., bolts, screws, etc.) pass thru apertures (e.g., rubberized rings) disposed circumferentially 38 about the rubberized edge 50 to secure the FOD screen 11.

Although the above embodiments discuss a single FOD screen 11, in certain embodiments, multiple FOD screens 11 (e.g., disposed in succession) may be utilized. The multiple FOD screens 11 utilized may include different characteristics (e.g., tensile strength, size of mesh opening, etc.).

Technical effects of the disclosed embodiments include providing a FOD screen to block debris or foreign objects from entering an air intake of a gas turbine engine. The FOD screen includes a woven mesh made of a flexible, non-metal material (e.g., para-aramid synthetic fibers). The FOD screen is lighter than typical FOD screens without sacrificing the ability to block foreign objects or debris. The flexible nature of the woven mesh minimizes denting or breakage to the screen as well as wear damage from vibration. Thus, the FOD screen includes a greater product life than typical FOD screens. Further, the flexible nature of the material of the disclosed FOD screen enables the FOD screen to be installed in areas typically considered impractical or difficult for installation.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a foreign object damage (FOD) screen configured to be disposed upstream of an air intake of a gas turbine engine and to keep debris from entering the air intake, wherein the FOD screen is configured to extend across a fluid flow path extending through the air intake into the gas turbine engine, and wherein the FOD screen comprises a flexible, woven fabric made of a non-metal material and configured to absorb and dissipate energy from the debris, and the flexible, woven fabric comprises a tensile strength ranging 2700 megapascals (mPa) and 3700 mPa;
    a housing; and
    an inlet silencer disposed within the housing;
    wherein the FOD screen is coupled to a wall of the housing at a location between the inlet silencer and the air intake, and wherein the flexible, woven fabric of the FOD screen is configured to move axially along a longitudinal axis of the gas turbine engine relative to an axial location of coupling of the FOD screen to the wall located upstream of the gas turbine engine.

2. The system of claim 1, wherein the flexible, woven fabric comprises a modulus of elasticity ranging between 130 and 180 gigapascals.

3. The system of claim 1, wherein the flexible, woven fabric comprises a density ranging between 1.40 and 1.45 grams per cubic centimeter.

4. The system of claim 1, wherein the flexible, woven fabric comprises an open mesh para-aramid synthetic fibers.

5. The system of claim 1, wherein the FOD screen comprises a rubberized edge disposed along an entire perimeter of the flexible, woven fabric.

6. The system of claim 5, comprising an attachment mechanism configured to couple the FOD screen to the wall located upstream of the air intake, wherein the attachment mechanism comprises an annular retaining ring, and a plurality of fasteners, and wherein the rubberized edge is partially disposed about the annular retaining ring between the wall and the annular retaining ring, and each fastener of the plurality of fasteners is disposed through the wall, the rubberized edge, and the annular retaining ring to couple the FOD screen to the wall.

7. A system, comprising:
    a gas turbine engine having an engine bell mouth and a nose cone;
    a foreign object damage (FOD) screen configured to be disposed upstream of an air intake of the gas turbine engine and to keep debris from entering the air intake, wherein the FOD screen is configured to extend across a fluid flow path extending through the air intake into the gas turbine engine, the FOD screen is secured over and coupled to the engine bell mouth, the FOD screen contacts the nose cone or an extension disposed on the nose cone to increase a surface area of the FOD screen; and wherein the FOD screen comprises an open mesh of para-aramid synthetic fibers.

8. The system of claim 7, wherein the open mesh of para-aramid synthetic fibers comprises a modulus of elasticity ranging between 130 and 180 gigapascals.

9. The system of claim 7, wherein the open mesh of para-aramid synthetic fibers comprises a density ranging between 1.40 and 1.45 grams per cubic centimeter.

10. The system of claim 7, wherein the open mesh of para-aramid synthetic fibers comprises a tensile strength ranging between 2700 megapascals (mPa) and 3700 mPa.

11. The system of claim 7, comprising a housing with an inlet silencer disposed within the housing, and the FOD screen is coupled to a wall of the housing at a location between the inlet silencer and the air intake.

12. The system of claim 7, wherein the FOD screen comprises a rubberized edge disposed along an entire perimeter of the open mesh of para-aramid synthetic fibers.

13. The system of claim 12, comprising an attachment mechanism configured to couple the FOD screen to a wall located upstream of the air intake, wherein the attachment mechanism comprises an annular retaining ring, and a plurality of fasteners, and wherein the rubberized edge is partially disposed about the annular retaining ring between the wall and the annular retaining ring, and each fastener of the plurality of fasteners is disposed through the wall, the rubberized edge, and the annular retaining ring to couple the FOD screen to the wall.

14. The system of claim 7, wherein the open mesh of para-aramid synthetic fibers of the FOD screen is configured to move axially along a longitudinal axis of the gas turbine engine relative to an axial location of coupling of the FOD screen to a wall located upstream of the air intake.

15. A system, comprising:
    a housing;
    an inlet silencer disposed within the housing;
    a foreign object debris (FOD) screen configured to keep debris from entering an air intake of a gas turbine engine, comprising:
        an open mesh of para-aramid synthetic fibers; and
        a rubberized edge disposed along an entire perimeter of the open mesh of para-aramid synthetic fibers;

wherein the FOD screen is coupled to a wall of the housing at a location between the inlet silencer and the air intake, the open mesh of para-aramid synthetic fibers is configured to extend across a fluid flow path that extends through the air intake into the gas turbine engine, and the rubberized edge is configured to enable coupling of the FOD screen upstream of the air intake, and wherein the open mesh of para-aramid synthetic fibers of the FOD screen is configured to move axially along a longitudinal axis of the gas turbine engine relative to an axial location of coupling of the FOD screen upstream of the air intake.

16. The system of claim 15, wherein the open mesh of para-aramid synthetic fibers comprises a modulus of elasticity ranging between 130 and 180 gigapascals.

17. The system of claim 16, wherein the open mesh of para-aramid synthetic fibers comprises a tensile strength ranging between 2700 megapascals (mPa) and 3700 mPa.

18. The system of claim 1, comprising a gas turbine engine having an engine bell mouth and a nose cone, and the FOD screen is secured over and coupled to the engine bell mouth, and the FOD screen contacts the nose cone or an extension disposed on the nose cone to increase a surface area of the FOD screen.

* * * * *